US007424416B1

(12) United States Patent
Cavanagh et al.

(10) Patent No.: US 7,424,416 B1
(45) Date of Patent: Sep. 9, 2008

(54) INTERFACING HARDWARE EMULATION TO DISTRIBUTED SIMULATION ENVIRONMENTS

(75) Inventors: Carl Cavanagh, Oakland, CA (US); Steven A. Sivier, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 643 days.

(21) Appl. No.: 10/984,335

(22) Filed: Nov. 9, 2004

(51) Int. Cl.
G06G 7/62 (2006.01)
G06F 17/50 (2006.01)
G06F 13/10 (2006.01)
G06F 9/455 (2006.01)

(52) U.S. Cl. .................. 703/13; 703/14; 703/16; 703/20; 703/23

(58) Field of Classification Search .......... 703/13, 703/14, 16, 17, 20, 23
See application file for complete search history.

(56) References Cited

U.S. PATENT DOCUMENTS

| | | |
|---|---|---|
| 4,456,994 A | 6/1984 | Segarra |
| 4,821,173 A | 4/1989 | Young et al. |
| 4,937,173 A | 6/1990 | Kanda et al. |
| 5,185,865 A | 2/1993 | Pugh |
| 5,327,361 A | 7/1994 | Long et al. |
| 5,339,435 A | 8/1994 | Lukin et al. |
| 5,398,317 A | 3/1995 | Nugent |
| 5,442,772 A | 8/1995 | Childs et al. |
| 5,455,928 A | 10/1995 | Herlitz |
| 5,519,848 A | 5/1996 | Wloka et al. |
| 5,625,580 A | 4/1997 | Read et al. |
| 5,634,010 A | 5/1997 | Ciscon et al. |
| 5,715,184 A | 2/1998 | Tyler et al. |
| 5,732,247 A | 3/1998 | Dearth et al. |
| 5,751,941 A | 5/1998 | Hinds et al. |
| 5,794,005 A | 8/1998 | Steinman |
| 5,812,824 A | 9/1998 | Dearth et al. |
| 5,838,948 A * | 11/1998 | Bunza ........................ 703/27 |
| 5,848,236 A | 12/1998 | Dearth et al. |
| 5,850,345 A | 12/1998 | Son |

(Continued)

OTHER PUBLICATIONS

"Rule Base Driven Conversion of an Object Oriented Design Structure Into Standard Hardware Description Languages," Verschueren, A.C., IEEE Xplore, appears in Euromicro Conference, 1998, Proceedings. 24th, vol. 1, Aug. 25, 1998, pp. 42-45.

(Continued)

Primary Examiner—Paul L Rodriguez
Assistant Examiner—Juan C Ochoa
(74) Attorney, Agent, or Firm—Meyertons Hood Kivlin Kowert & Goetzel, P.C.; B. Noël Kivlin (57) ABSTRACT

A system for interfacing hardware emulation to software simulation environments may include a simulation node configured to simulate a first portion of a system under test and a hardware emulation node configured to emulate a second portion of the system under test. The hardware emulation node may also be configured to exchange simulation information (such as representations of signal values obtained as output from the emulated portion of the system under test) with the simulation node. The hardware emulation node may contain a field programmable gate array devices (FPGA) configured to perform the hardware emulation. The FPGA may be mounted on an expansion board, such as a PCI (Peripheral Component Interconnect) board.

11 Claims, 7 Drawing Sheets

U.S. PATENT DOCUMENTS

| | | | |
|---|---|---|---|
| 5,870,585 | A | 2/1999 | Stapleton |
| 5,875,179 | A | 2/1999 | Tikalsky |
| 5,881,267 | A | 3/1999 | Dearth et al. |
| 5,892,957 | A | 4/1999 | Normoyle et al. |
| 5,907,685 | A | 5/1999 | Douceur |
| 5,907,695 | A | 5/1999 | Dearth |
| 5,910,903 | A | 6/1999 | Feinberg et al. |
| 5,991,533 | A | 11/1999 | Sano et al. |
| 6,031,987 | A | 2/2000 | Damani et al. |
| 6,053,947 | A | 4/2000 | Parson |
| 6,117,181 | A | 9/2000 | Dearth et al. |
| 6,134,234 | A | 10/2000 | Kapanen |
| 6,345,242 | B1 | 2/2002 | Dearth et al. |
| 6,507,809 | B1 | 1/2003 | Yoshino et al. |
| 6,675,334 | B2 | 1/2004 | Wadley |
| 6,711,411 | B1 | 3/2004 | Ruffini |
| 6,732,068 | B2 | 5/2004 | Sample et al. |
| 6,748,451 | B2 | 6/2004 | Woods et al. |
| 2003/0093252 | A1 | 5/2003 | Frankel |
| 2003/0093253 | A1 | 5/2003 | Freyensee |
| 2003/0093254 | A1 | 5/2003 | Frankel |
| 2003/0093255 | A1 | 5/2003 | Freyensee |
| 2003/0093256 | A1 | 5/2003 | Cavanagh |
| 2003/0093257 | A1 | 5/2003 | Cavanagh |
| 2003/0093569 | A1 | 5/2003 | Sivier |
| 2003/0229486 | A1* | 12/2003 | Ito ............... 703/27 |

OTHER PUBLICATIONS

"Modeling Communication with Objective VHDL," Putzke, et al., IEEE Xplore, appears in Verilog HDL Conference and VHDL International Use Forum, 1998, IVC/VIUF, Proceedings., 1998 International, Mar. 16, 1998, pp. 83-89.

"A Procedural Language Interface for VHDL and its Typical Applications," Martinolle, et al., IEEE Xplore, appears in Verilog HDL Conference and VHDL International Use Forum, 1998, IVC/VIUF, Proceedings, 1998 International, Mar. 16, 1998, pp. 32-38.

"The Verilog Procedural Interface for the Verilog Hardware Description Language," Dawson, et al., IEEE Xplore, appears in Verilog HDL Conference, 1996, Proceedings., 1996 International, Feb. 26, 1996, pp. 17-23.

"An Integrated Environment for HDL Verification," York, et al., IEEE Xplore, appears in Verilog HDL Conference, 1995, Proceedings, 1995 International, Mar. 27, 1995, pp. 9-18.

"The PowerPC 603 C++ Verilog Interface Model," Voith, R.P., IEEE Xplore, appears in Compcon Spring '94, Digest of Papters, Feb. 28, 1994, pp. 337-340.

Networked Object Oriented Verification with C++ and Verilog, Dearth, et al., IEEE, XP-002144328, 1998, 4 pages.

Patent Abstracts of Japan, publication No. 10326835, published Dec. 8, 1998.

Patent Abstracts of Japan, publication No. 10049560, published Feb. 20, 1998.

Patent Abstracts of Japan, publication No. 10340283, published Dec. 22, 1998.

Patent Abstracts of Japan, publication No. 07254008, published Oct. 3, 1995.

"Multiprocessing Verilog Simulator Exploits the Parallel Nature of HDLs." Lisa Maliniak, Electronic Design, Abstract, May 30, 1994, 1 page.

"It's A Multithreaded World, Part I," Charles J. Northrup, BYTE, May 1992, 7 pages.

"It's A Multithreaded World, Part 2," Charles J. Northrup, BYTE, Jun. 1992, pp. 351-356.

"Weaving a Thread," Shashi Prasad, BYTE, Oct. 1995, pp. 173-174.

"Making Sense of Collaborative Computing," Mark Gibbs, Network World Collaboration, Jan. 10, 1994, 4 pages.

"Parallel Logic Simulation of VLSI Systems," Bailey, et al., ACM Computing Surveys, vol. 26, No. 3, Sep. 1994, pp. 255-294.

"Multithreaded Languages for Scientific and Technical Computing," Cherri M. Pancake, Proceedings of the IEEE, vol. 81, No. 2, Feb. 1993, pp. 288-304.

"Distributed Simulation Architecture, SW Environment, Enterprise Server Products," Purdue EE400 Presentation by Freyensee and Frankel, Nov. 9, 2000, 13 pages.

"BNF and EBNF: What Are They And How Do They Work?," Lars Marius Garshol, Oct. 12, 1999, pp. 1-10.

"VCK: Verilog-C Kernel," Testbench Automation, Distributed by Verilog Simulation, Hardware-Software Co-verification, 2001 Avery Design Systems, Inc., 8 pages.

"Principles of Verilog PLI," Swapnajit Mittra, Silicon Graphics Incorporated, 1999, 10 pages.

"IEEE Standard Hardware Description Language Based on the Verilog® Hardware Description Language," IEEE, Dec. 12, 1995, 8 pages.

"OpenVera 1.0, Language Reference Manual," Version 1.0, Mar. 2001, pp. 4-1 to 4-34, pp. 5-1 to 5-32, 6-1 to 6-22, 7-1 to 7-24, 11-1 to 11-50, 12-1 to 12-8, 13-1 to 13-14, 14-1 to 14-20, 15-1 to 15-118.

"VLSI Designe of a Bus. Arbitration Module for the 68000 Series of Microprocessors," Ososanya, et al., IEEE, 1994, pp. 398-402.

"A VHDL Standard Package for Logic Modeling," David R. Coelho, IEEE Design & Test of Computers, vol. 7, Issue 3, Jun. 1990, pp. 25-32.

"Corrected Settling Time of the Distributed Parallel Arbiter," M.M. Taub, PhD., IEEE Proceedings, Part E: Computers & Digitals, vol. 139, Issue 4, Jul. 1992, pp. 348-354.

"Quickturn Unveils Emulation and Prototyping Products," Worldwide Videotex, vol. 13, Issue 7, p. 1-5, Jul. 1, 2000.

"Extreme-II," Verisity Ltd., pp. 2, 2004.

"New Palladium II Extends Cadence Acceleration/Emulation Leadership," Hehir, Kristin, Cadence Design Systems, Inc., pp. 2, Oct. 25, 2004.

"iProve AMBA Design Toolkit," Dynalith Systems, pp. 2, Sep. 6, 2004.

"iProve Intelligent PROtotype Verification Engine," Dynalith Systems Co., Ltd., pp. 2, 2001-2004.

* cited by examiner

INTERFACING HARDWARE EMULATION TO DISTRIBUTED SIMULATION ENVIRONMENTS

BACKGROUND OF THE INVENTION

1. Field of the Invention

This invention relates to the field of computer systems and, more particularly, to distributed simulation environments.

2. Description of the Related Art

Generally, the development of components for an electronic system such as a computer system includes design verification of the components, which may be accomplished, for example, by simulation of models of the components. During simulation, the specified functions of each component may be tested and, when incorrect operation (a bug) is detected, the model of the component may be changed to generate correct operation. Once design verification is complete, the model may be fabricated to produce the corresponding component. Since many of the bugs may have been detected in design verification, the component may be more likely to operate as specified and the number of revisions to hardware may be reduced. Simulation models are frequently described in a hardware description language (HDL) such as Verilog, VHDL, etc.

Originally, simulations of electronic systems were performed on a single computing system. However, as the electronic systems (and the components forming systems) have grown larger and more complex, single-system simulation has become less desirable. The speed of the simulation (in cycles of the electronic system per second) may be reduced due to the larger number of gates in the model which require evaluation. Additionally, the speed may be reduced as the size of the electronic system model and the computer code to perform the simulation may exceed the memory capacity of the single system. In some cases, the simulators may not be capable of simulating the entire model. As the speed of the simulation decreases, simulation throughput is reduced.

To address these issues, distributed simulation has become more common. Generally, a distributed simulation system includes two or more computer systems (i.e. nodes) simulating portions of an electronic system in parallel. Furthermore, each node must communicate with other nodes to transfer information between different simulated portions of the electronic system. More particularly, a distributed simulation system may sample output signals from the portions of the system simulated by each node and communicate the corresponding signal values to other nodes. The received signal values are then driven as inputs to the models in those other nodes.

When a complex electronic system is partitioned into portions for design verification using simulations, in many cases the amount of processing required to simulate a given portion may differ from the amount of processing required to simulate another portion. As coordination and/or synchronization between different nodes involved in the distributed simulation may be required after each node has completed processing for a particular simulated time interval, a given node may be unable to continue simulation until all other nodes have also completed processing for the same interval. Thus, the overall simulation throughput of a distributed simulation system may be limited by the speed of the slowest node in the system. Accordingly, nodes capable of quickly verifying the design of relatively large portions of a simulated electronic system in a cost-effective manner, while at the same time coordinating and synchronizing with other distributed simulation nodes and allowing for flexible reconfiguration, may be desirable.

SUMMARY

Various embodiments of a system and method for interfacing hardware emulation to software simulation environments are disclosed. According to a first embodiment, the system may include a simulation node configured to simulate a first portion of a system under test and a hardware emulation node configured to emulate a second portion of the system under test. The hardware emulation node may also be configured to exchange simulation information (such as representations of signal values obtained as output from the emulated portion of the system under test) with the simulation node. The hardware emulation node may contain a field programmable gate array device (FPGA) configured to perform the hardware emulation. The FPGA may be incorporated within or mounted on an expansion board (e.g., a personal computer expansion board) such as a PCI (Peripheral Component Interconnect) board. In other embodiments, multiple expansion boards may be included in the hardware emulation node, with one or more FPGAs mounted on each expansion board.

Each FPGA may include logic under test (representing the portion of the system under test being emulated on the FPGA), a drive logic block, a sample logic block, and a PCI interface. The drive logic block may be configured to drive input signals to the logic under test. The input signals may be driven in response to drive messages generated by a software emulation controller included within the hardware emulation node. The drive messages, in turn, may be generated by the emulation controller in response to simulation information received from other nodes of the system (e.g., a simulation node or other hardware emulation nodes). The sample logic block may be configured to sample an output signal of the logic under test. The sampled output signal may be sent to the emulation controller via the PCI interface, mapped to a logical signal, formatted according to a grammar used by the nodes of the system, and sent to another node (such as a simulation node or other hardware emulation nodes). The sampled output signal may thereby be used to drive simulations and/or emulations at other nodes, while the input signals may be generated in response to simulation events or emulation outputs at other nodes, thereby providing a mechanism for coordinated distributed design verification across the nodes of the system.

In one embodiment, the system may also include a distributed control node, configured to coordinate the simulations and emulations being performed at simulation and hardware emulation nodes, respectively. In another embodiment, the system may also include a hub configured to route messages (such as messages containing the simulation information, as well as other commands) between the remaining nodes of the system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 1:
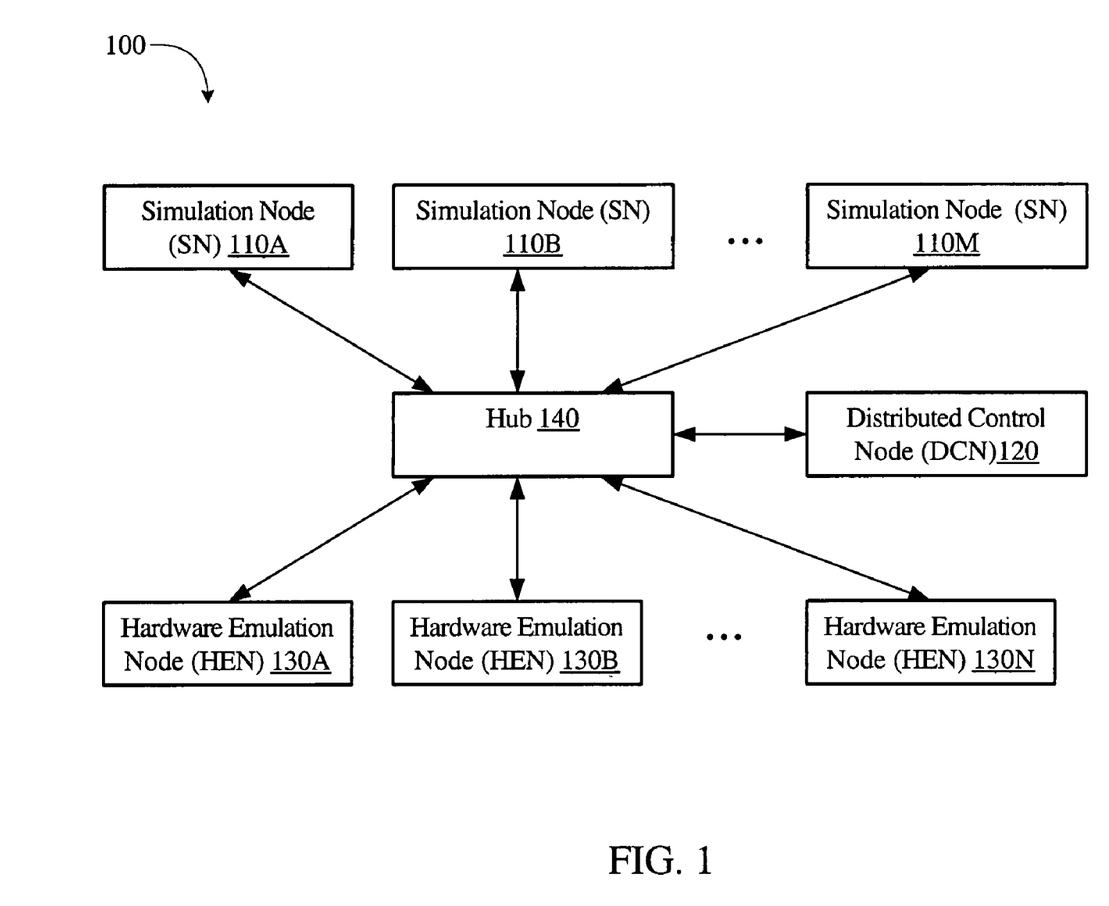
FIG. 1 is a block diagram of one embodiment of a distributed design verification system.

FIG. 1 is a block diagram of one embodiment of a distributed design verification system 100. In the embodiment of FIG. 1, the distributed design verification system (DDVS) 100 includes a plurality of simulation nodes (SNs) 110A-110M, a plurality of hardware emulation nodes (HENs) 130A-130N, a distributed control node (DCN) 120, and a hub 140. As used herein, a generic element identified to represent a collection of specific elements may be referred to by number alone. For example, a generic SN representative of any of SN 110A-110M may be referred to simply as SN 110.

Distributed design verification system 100 may be operable to verify the design of an electronic system, such as a computer system, by partitioning the electronic system into a plurality of portions, simulating some portions on SNs 110 and emulating other portions on HENs 130. The electronic system whose design is being verified may be referred to herein as a "system under test". A system under test representing a multiprocessor computer system may include, for example, multiple central processing units (CPUs), numerous application-specific integrated circuits (ASICs), and various processor boards, I/O boards, and other boards. For such a system under test, a particular CPU may be emulated at a given HEN 130, one or more ASICs at an SN 110, and an I/O or processor board at another SN 110. In one embodiment, the system under test could be a system on a chip (SOC). In some embodiments, a portion of a CPU, an ASIC or board may be emulated at a given HEN 130 or simulated at an SN 110, rather than the entire component. In other embodiments, multiple components, such as ASICs, may be emulated at a given HEN 130 or SN 110, as desired.

SNs 110, HENs 130, DCN 120 and hub 140 may all be referred to as nodes of DDVS 100. Generally, a node is the hardware and software resources for: (i) simulating a component or portion of the system under test; (ii) emulating a component or portion of the system under test; or (iii) running a test program or other code (e.g. communication routing code in the hub) for controlling or monitoring the simulation. A node may include one or more of: a computer system (e.g. a server or a desktop computer system), one or more processors within a computer system (and some amount of system memory allocated to the one or more processors) where other processors within the computer system may be used as another node or for some other purpose, etc. Multiple nodes may be incorporated within a single computer host or system in some embodiments. The interconnection between the nodes illustrated in FIG. 1 may therefore be a logical interconnection. For example, in one implementation, Unix sockets are created between the nodes for communication. Other embodiments may use other logical interconnection (e.g. remote procedure calls, defined application programming interfaces (APIs), shared memory, pipes, etc.). The physical interconnection between the nodes may vary. For example, the computer systems including the nodes may be networked using any network topology. Nodes operating on the same computer system may physically be interconnected according to the design of that computer system.

An SN 110 may include any simulator and a model of the portion of the system under test simulated in that node, as described below in further detail. For example, event-driven simulators may be used. Alternatively, cycle-based simulators may be used. Exemplary simulators may include the VCS simulator from Synopsys, Inc. (Mountain View, Calif.); the NCVerilog simulator from Cadence Design Systems, Inc. (San Jose, Calif.); the VerilogXL simulator from Cadence; or the SystemSim program from Co-Design Automation, Inc. of Los Altos, Calif., or any other simulator may be used. The model may be coded in any HDL (e.g. Verilog, VHDL, etc.) supported by the simulators used. The SNs 110 may further include control code used to exchange simulation information with other nodes, to control the simulation within the node, etc. Not all SNs 110 in DDVS 100 may use the same simulator; that is, different simulators may be employed at different SNs within a single DDVS 100. In addition, SNs 110 may differ from one another in processing capacity, I/O capacity, memory capacity, etc.

An HEN 130 may comprise one or more expansion boards, each of which may contain programmable logic, such as one or more field programmable gate array devices (FPGAs) operable to emulate a portion of the system under test, as described below in further detail. Each HEN 130 may also further include software modules used to exchange simulation information with other nodes, to control the emulation within the HEN, etc. The term "simulation information", as used herein, may refer to any combinations of signals or commands that may be used to control simulation and/or emulation of one or more portions of the system under test, or to provide status on the simulation and/or emulation of a portion of the system under test. Further information related to specific commands and signals included within simulation information is provided below in greater detail. Any suitable FPGA or FPGAs from any desired FPGA vendor (such as Xilinx, Altera, etc.) or combination of vendors, where the FPGA is programmable to emulate desired logic whose design is to be verified, may be used within an HEN. The configuration of different HENs within DDVS 100 may differ, for example in the number of expansion boards and/or FPGAs included, the FPGA vendor, the processing, memory and/or I/O capacity of the HEN 130. Not all the slots available for expansion boards within an HEN may be used for hardware emulation at any given time; that is, it may be possible to increase or decrease the amount or complexity of hardware emulation being performed at an HEN by changing the number of expansion boards and corresponding FPGAs being utilized.

DCN 120 is a node which may execute a test program or other code which is not part of the system under test, but instead may be used to control the distributed design verification process (e.g., to coordinate simulation and hardware emulation being performed at other nodes), introduce some test value or values into the system under test (e.g. injecting an error on a signal), monitor the simulation for certain expected results or to log the simulation results, etc. It is noted that in some embodiments, multiple DCNs 120 may be employed within a DDVS 100. A DCN 120 may communicate with SNs 110 and/or HENs 130 to provide a test value, to request a value of a physical signal or other hardware modeled in the component simulated or emulated in the SN 110 or HEN 130, to communicate commands to the simulator in the SN 110 or the emulator in an HEN 130, to control the simulation, etc.

Hub 140 may be provided for routing communications between the various other nodes in the distributed design verification system 100. Each SN 110, HEN 130, or DCN 120 transmits message packets to the hub, which parses the message packets and forwards message packets to the destination node or nodes for the message. Additionally, hub 140 may be the destination for some message packets (e.g. for synchronizing the simulation across the multiple SNs 110, HENs 130 and DCNs 120). It is noted that in some embodiments, SNs 110, HENs 130 and DCNs 120 may be capable of sending messages directly to each other without the use of a hub 140, i.e., hub 140 may be omitted from DDVS 100 in some embodiments.

As mentioned above, communication between the nodes of DDVS 100 may be in the form of message packets. The format and interpretation of the message packets may be specified by a grammar implemented by the nodes. The grammar may be an extendable language comprising predefined commands for communicating between nodes, providing for command/control message packets for the simulation/emulation as well as message packets transmitting signal values (and optionally signal strength information). Message packets transmitting signal values may be referred to as signal transmission message packets, and the command in the message packet may be referred to as a transmit command. The grammar may allow for more abstract communication between the nodes, allowing for the communication to be more human-readable than the communication of only physical signals and values of those signals between the nodes. Because the grammar may be used to convey signal information among different SNs 110 employing different simulators, but not information specific to any given simulator, the grammar may be said to be simulator agnostic. The grammar may also be used to communicate configuration information (e.g., mappings of corresponding ports at different SNs and HENs), or to store configuration information in files at one or more nodes of DDVS 100. As used herein, a physical signal is a signal defined in the simulation model (e.g., at an SN 110) or hardware emulation (e.g., at an HEN 130) of a given component of the system under test. A logical signal is a signal defined using the grammar. Logical signals may be mapped to physical signals (or vice versa) using one or more grammar commands.

Generally, a message packet may be any communication between nodes in the distributed simulation system. The message packet may be encoded in any format (e.g. binary, a string of characters, etc.). Each message packet may include one or more commands. In one embodiment, each message packet may comprise one command. In one specific implementation, the command may comprise a string of one or more characters comprising the name of the command, a separator character (e.g. an open brace in one embodiment, although any character may be used), an optional set of arguments, and a second separator character (e.g. a close brace in one embodiment, although any character may be used) which marks the end of the command. A transmit command may include a source model instance or hardware emulation as an argument, as well as a model, hardware emulation and port list for the logical port or ports for which signal values are being provided. Other commands may include stop commands for pausing the simulation/emulation, start commands for resuming the simulation/emulation, a no-operation command (NOP) for simulation/emulation synchronization and replying to commands, commands for the hub to synchronize timestep transitions or clock cycles, and optionally phases in the timestep or clock cycle, etc.

Figure 2:
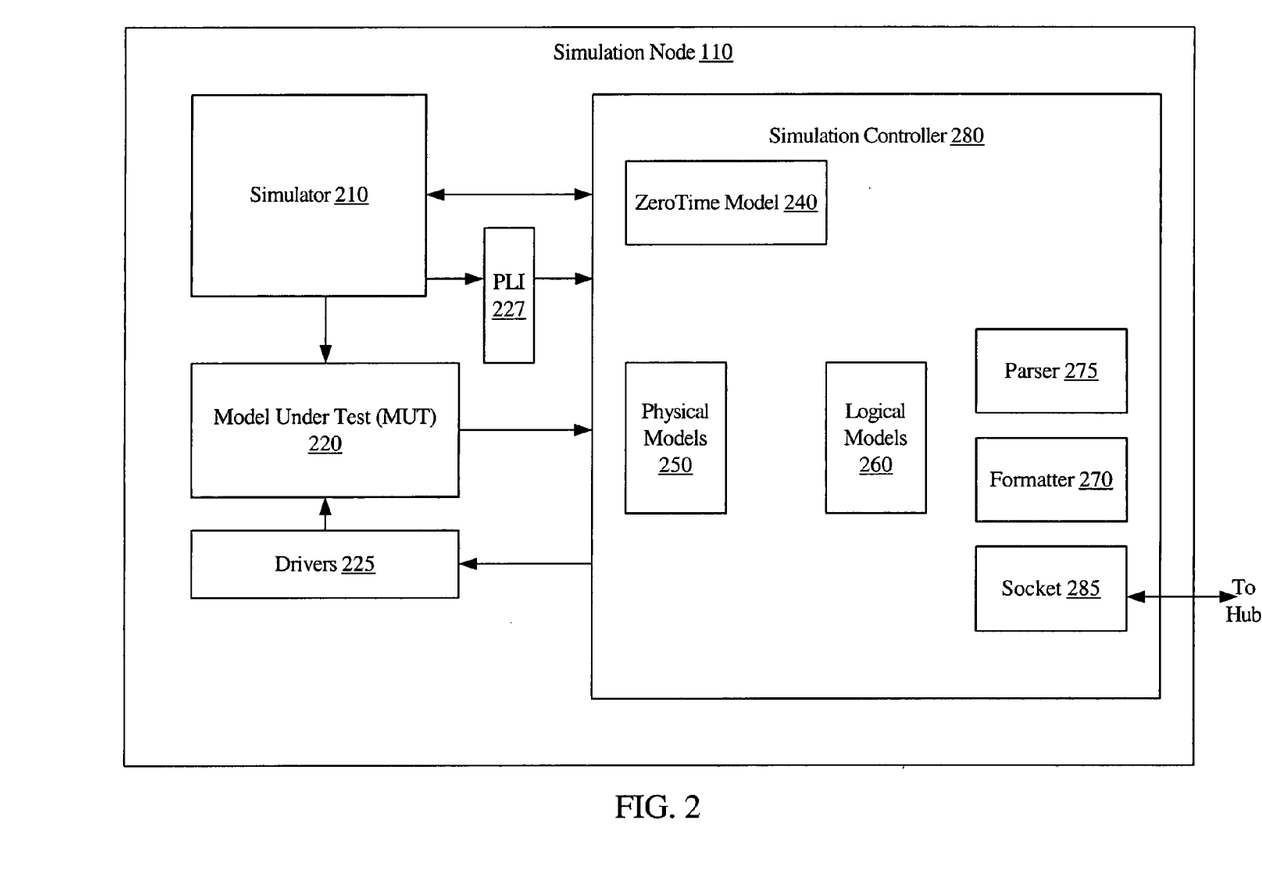
FIG. 2 is a block diagram of one embodiment of a simulation node.

FIG. 2 is a block diagram of one embodiment of a simulation node (SN) 110. In the illustrated embodiment, SN 110 comprises a simulation controller 280, a simulator 210, a model under test (MUT) 220 (representing the portion of the system under test being simulated at the SN) and drivers 225. Simulation controller 280 may comprise software used to control the simulation within the illustrated SN and coordinate with other SNs, HENs, and DCNs. Simulator 210 may be configured to interact with simulation controller 280 using a programming language interface (PLI) 227. A zero-time model 240, one or more physical models 250, one or more logical models 260, a parser 275, a formatter 270, and a socket 285 may each represent software modules included within simulation controller 280.

Generally, MUT 220 may be a simulatable model of a component of a system under test. The model may be an HDL model (e.g. a Verilog model, a VHDL model, etc.). The model may be a register transfer level (RTL) model of the design of the component. Alternatively, the model may be a behavioral description of the operation of the component, again written in HDL. The model may be a behavioral or functional model written in a verification language such as Vera®. A hardware verification language may provide a higher level of abstraction than an HDL. The model may also be coded in other languages (e.g. high level programming languages such as C or C++).

Drivers 225 may be used to specify values for input signals to be received by MUT 220. In some embodiments, MUT may include bi-directional ("bidi") signals, and drivers 225 may include drivers for such bi-directional signals. Simulation controller 280 may place a value to be driven on an input or bi-directional signal (e.g., based on transmit commands received from other nodes) and enable the driver to supply the proper state on the input or bi-directional signal.

Simulator 210 may generally be any commercially available simulator for the MUT 220. For example, Verilog embodiments may employ the NCVerilog program manufactured by Cadence Design Systems, Inc. (San Jose, Calif.); the VCS program manufactured by Synopsys, Inc. (Mountain View, Calif.); the VerilogXL simulator from Cadence; or the SystemSim program from Co-Design Automation, Inc. of Los Altos, Calif., among others. In one embodiment, simulator 210 may be an event driven simulator, although other embodiments may employ any type of simulator including cycle based simulators.

SN 110 may simulate MUT 220 as a series of timesteps in some embodiments. Generally, a timestep is the granule of simulation time by which the simulator 210 evaluates events and advances. For example, in one embodiment each time step may simulate the operation of the MUT 220 for one nanosecond. As described below, an HEN 130 may also emulate its portion of the system under test, which may be referred to as its "logic under test" (LUT) using timesteps. As used herein, the phrase "evaluating the model" may refer to processing, by a simulator such as simulator 210, of each of the then-scheduled events which occur in the current timestep.

In some embodiments, distributed design verification system 100 may include at least two phases within a simulated or emulated timestep: a zero time phase and a real time phase. Further details regarding emulated timesteps, including zero time phase emulation and real time phase emulation, are provided below. During the zero time phase, SNs 110, HENs 130, DCNs 120, and hub 140 may communicate with as many commands as desired (including commands which sample output signals of MUTs, and/or change the values of input signals of MUTs) while the simulation and emulation is frozen. In other words, SNs 110 do not cause their simulators 210 to evaluate MUTs 220 during the zero time phase (even if the received commands would otherwise cause scheduling of one or more events in the simulator). In some embodiments, zero time model 240 may include one or more data structures such as queues to retain representations of events that may need to be simulated or emulated after the zero time phase completes. At the end of the zero time phase, any events scheduled as a result of activities in the zero time phase may be evaluated at SNs 110. Simulator 210 may be configured to interact with zero time model 240 of simulation controller 280 (for example, by calling zero time phase PLI functions implemented within zero time model 240) to simulate zero time phase operations.

The zero time phase may be used to allow test programs (e.g. from a DCN 120 or another SN 110) to transmit multiple commands to the various SNs and receive replies to those commands without the simulation progressing between the commands. Thus, for example, a first command may be sent to a SN to read a first signal value. Based on the returned value, the test program may send another command to read a second signal value. Since the simulator is frozen, the state of the second signal value is the same as it was when the first signal value was read (and vice versa). Accordingly, for example, a DCN 120 may assemble state information from multiple SNs 110, or from a single SN 110, using multiple commands and may be assured that the state returned for each command is consistent with the other state returned for the other commands (since the state of the simulation is frozen).

The real time phase may include the sampling and driving of signals from MUTs 220, and may also include time in which the responses to the driven signals are evaluated. The real time phase may further include evaluation of one or more commands received by the SN 110 (e.g. reading or writing signal values relative to a current state at the SN 110). The sample and drive of signals (and a subsequent evaluation of the MUT 220) may be iterated multiple times within a timestep. The sampling of signals may include reading the signal values from MUT 220 and transmitting one or more transmit commands with the sampled signal values. The driving of signals may include receiving one or more transmit commands with driven signal values and applying those signal values to the MUT 220 (e.g., using drivers 225). The subsequent evaluation of the MUT 220 may determine if the driven signal values cause any changes to signal values within the current timestep (e.g. if the driven signal asynchronously changes an output signal) and may also schedule events for subsequent timestep(s) based on the driven signal values. If any output signals have changed, another phase of sampling and driving may occur. The sampling and driving may be repeated until each SN does not detect any changes to its output signals in the current timestep, at which time the current timestep may terminate and the next timestep may begin. By iteratively sampling, driving, and evaluating the model, asynchronous signals may be handled within the timestep (if the asynchronous output changes during the timestep). During real time phase processing, physical models 250 and logical models 260 may be used to map physical signal representations (e.g., derived from sampling output signals of MUT 220 represented in HDL) to user-defined logical signals, and vice versa. It is noted that, in one embodiment, the user-defined logical signals may be arranged in user-defined logical ports, and that the routing of signals from node to node may be done on a logical port basis.

As described above, SN 110 may be configured to exchange simulation information with other nodes of DDVS 100 (e.g., SN 110 may send output signal values based on samples from MUT 220, and receive input signal values to drive MUT 220). Such inter-node communication may be facilitated using formatter 270, parser 275 and socket 285. Formatter 270 may be configured to format outgoing communications or messages from simulation controller 280 according to a grammar being used for inter-node communications. The formatted messages may be sent to hub 140 (or directly to other nodes) using socket 285. Incoming messages received on socket 285 from the hub 140 or from other nodes may be parsed according to the grammar and passed for further processing to other constituents of simulation controller 280. Socket 285 may be a generic Unix socket implementation for communicating with the hub 140, or a socket implemented according to the specifications of any desired operating system. While one socket 285 is shown with bi-directional communication with the hub 140 in the illustrated embodiment, other embodiments may include two independent sockets, each communicating in one direction (sending or receiving). Multiple unidirectional or bi-directional sockets may be used, as desired. In addition to the software modules described above, simulation controller 280 may also include other modules and/or objects, not shown in FIG. 2, such as modules representing individual physical and logical signals, commands, etc.

Figure 3A:
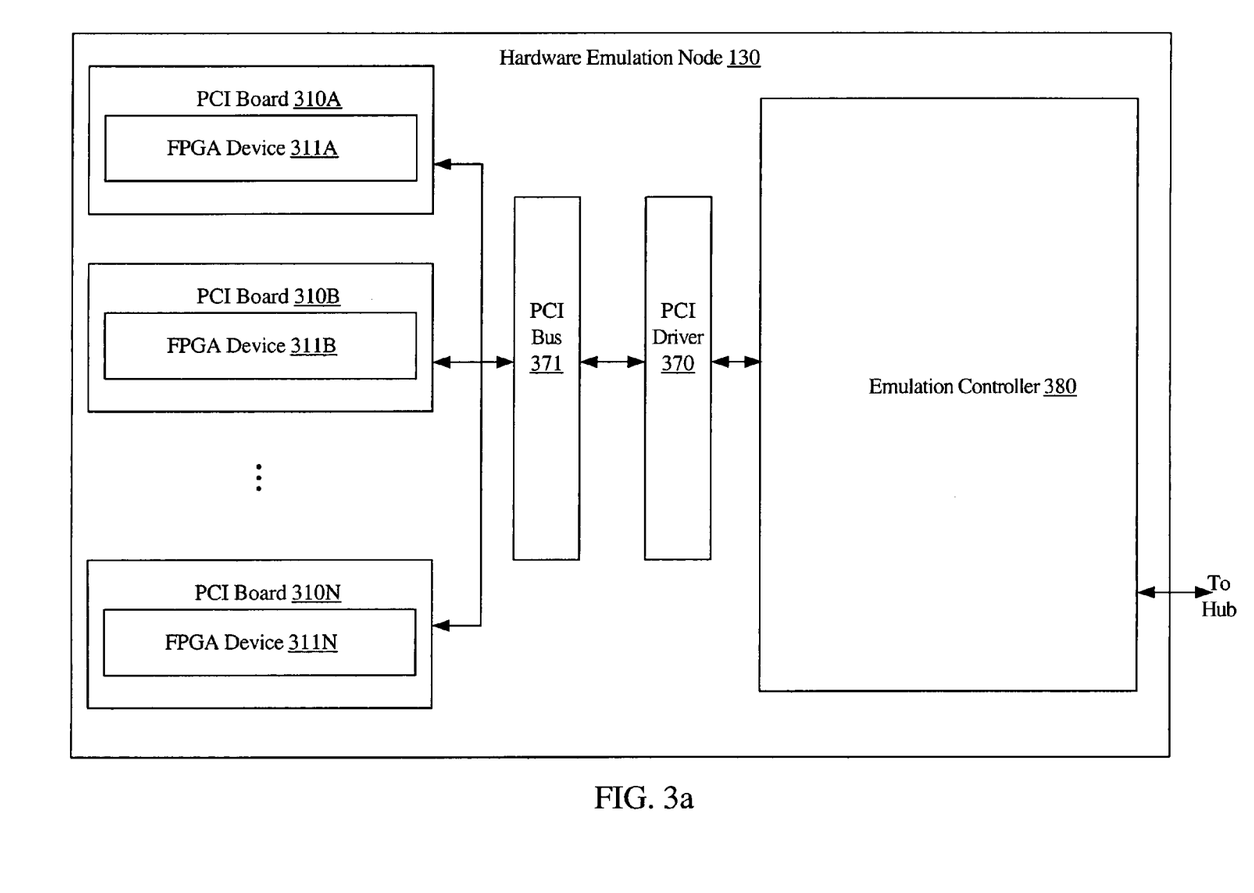
FIG. 3a is a block diagram of one embodiment of a hardware emulation node.

FIG. 3a is a block diagram illustrating one embodiment of a hardware emulation node (HEN) 130. In the illustrated embodiment, HEN 130 includes a plurality of PCI boards 310A-310N coupled to a PCI bus 371 (e.g., using a personal computer expansion slot), an emulation controller 380, and a PCI driver 370. Each PCI board 310 may incorporate a corresponding FPGA device 311—e.g., FPGA 311A may be mounted on PCI board 310A, FPGA 311B on PCI board 310B, etc. Emulation controller 380 may comprise software configured to control the emulation performed at FPGAs 310, using PCI driver 370 to communicate with FPGAs 311 over PCI bus 371. In addition, emulation controller 380 may be configured to communicate with other nodes of DDVS 100 (such as other HENs 130, SNs 110, and DCN 120), for example using hub 140. Further details about the structure and functions of the components illustrated in FIG. 3a are provided below.

Figure 3B:
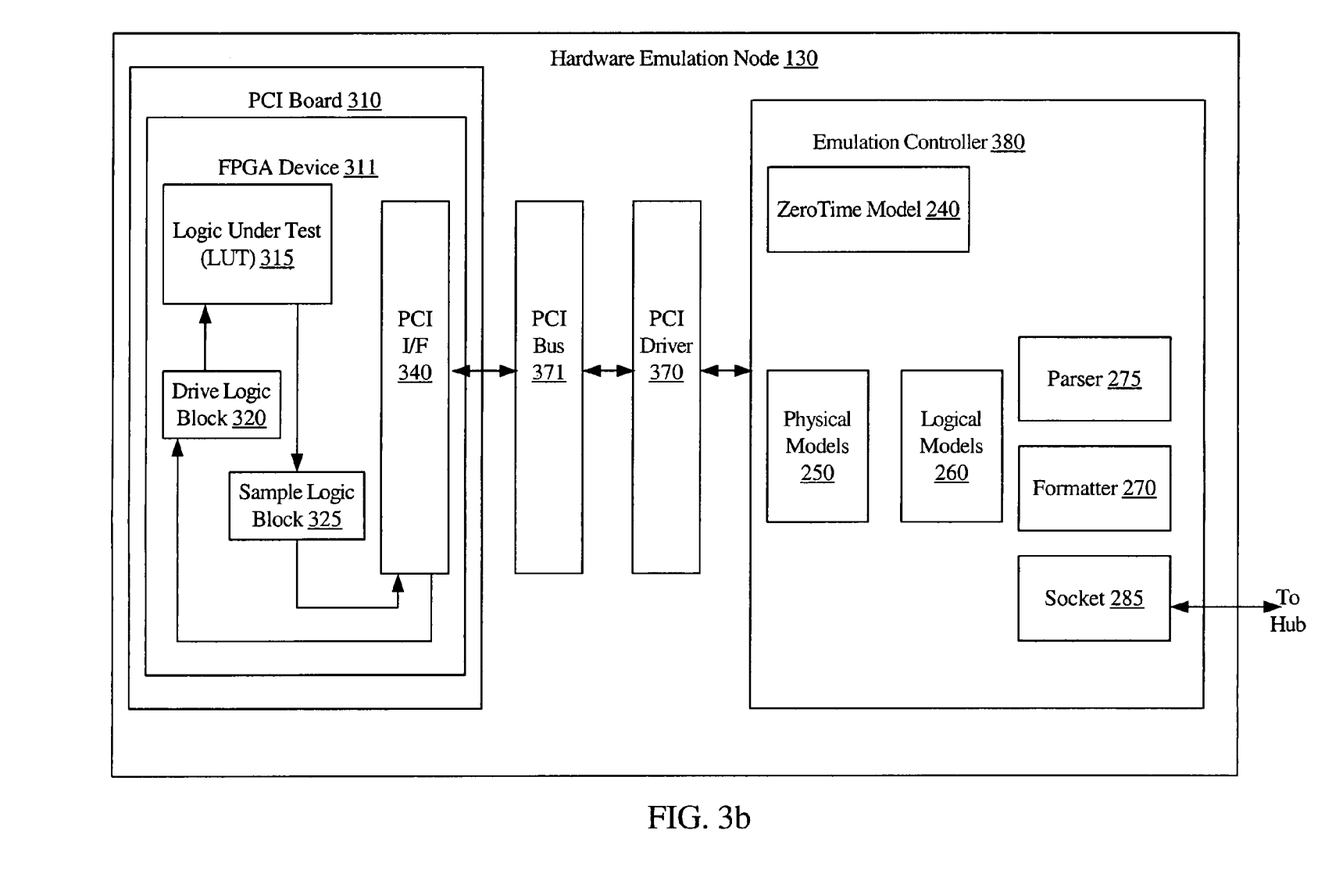
FIG. 3b is a block diagram of another embodiment of a hardware emulation node.

FIG. 3b is a block diagram illustrating an embodiment where a hardware emulation node 130 includes a single FPGA device 311. As shown, FPGA device 311 may include logic under test (LUT) 315 representing the portion of the system under test that is emulated at FPGA 311A, a drive logic block 320, a sample logic block 325, and a PCI interface (I/F) 340. It is noted that the structure and functional capabilities of each FPGA device 311A-311N shown in the embodiment depicted in FIG. 3a may be generally similar to that of FPGA 311 of FIG. 3b; therefore, the following description may refer to a single representative FPGA 311 instead of referring to individual FPGAs separately, and the details provided for the representative FPGA 311 may be applicable to each of the FPGAs depicted in FIG. 3a. In one embodiment, multiple FPGA devices 311 may be incorporated within a single PCI board 310, with each FPGA device including its own LUT, drive logic block, sample logic block and PCI interface.

Emulation controller 380 may comprise software used to control the emulation within the illustrated HEN and coordinate with other HENs, SNs, and DCNs, providing functionality generally similar to that provided by simulation controller 280 for an SN as described earlier. Emulation controller 380 may be configured to interact with each PCI board 310 and its components via PCI driver 370, which may be a software module configured to transmit commands and data in either direction over PCI bus 371 linking PCI boards 310 to the remaining components of the HEN. Various components providing similar functionality to the components of simulation controller 280, such as a zero-time model 240, one or more physical models 250, one or more logical models 260, a parser 275, a formatter 270, and a socket 280 may also be included within emulation controller 380. In addition, emulation controller 380 may also include other modules and/or objects, not shown in FIG. 3b, such as modules representing individual physical and logical signals, commands, etc.

The portion of system under test to be emulated at a PCI board 310 may be synthesized as LUT 315 within FPGA 311, for example using tools provided by the FPGA vendor or a third party vendor. Such tools, may, for example, allow a user to synthesize the portion of the system under test starting with an HDL representation, or a representation in another high-level language. Generally, LUT 315 may represent any emulatable portion or component of the system under test, such as part or all of a processor, an ASIC, a processor board, an I/O board, or any combination of such components. Drive logic block 320 may provide one or more signal drivers to drive LUT input signals (which may include bi-directional signals) in response to drive messages from emulation controller 380 received via PCI interface 340 and PCI driver 370. The drive messages may be generated by emulation controller 380 in response to signals or commands received from other nodes of DDVS 100, such as an SN 110 or another HEN 130. Sample logic block 325 may include a number of signal samplers that latch the LUT's output signals (which may also include bi-directional signals). Such a latched output signal may be sent to emulation controller 380 via PCI interface 340 and PCI driver 370, received and mapped by emulation controller 380 to a logical signal (e.g., using physical models 250 and logical models 260), formatted according to the grammar described above, and sent to other nodes of DDVS 100 such as an SN 110.

As seen by the rest of DDVS 100, the functionality provided by an HEN 130 in emulating its LUT 315 may be generally similar to the functionality provided by an SN 110 in simulating its MUT 220. That is, both HEN 130 and SN 110 may take commands (e.g., from a DCN 12) or input signals generated at other nodes of DDVS 100 as inputs, and provide responses (e.g., in the form of output signals and/or additional commands) representing the results of driving the input signals to their respective portions of the system under test. Thus, the functionality provided collectively by simulator 210, MUT 220, drivers 225 and PLI 227 may logically be similar to the functionality collectively provided by FPGA 311 and PCI driver 370, and the functionality provided by simulation controller 280 may be generally similar to that provided by emulation controller 380. As the LUT is emulated in hardware rather than being simulated entirely in software, however, the amount of logic that can be emulated within a given FPGA (as measured, for example, in gate count) or a combination of FPGAs within an HEN may exceed that which can be simulated within a single SN within the same time. Thus, combining HENs with SNs within DDVS 100 may allow for more complex parts of the system under test to be emulated using hardware emulation, while less complex portions may be simulated in software. In addition, using a combination of software simulation and hardware emulation may allow for flexible re-use of existing models or hardware emulations, without, for example, restricting design verification to either software simulation alone or hardware emulation alone. Furthermore, the use of inexpensive expansion boards such as PCI boards 310, rather than custom-built hardware emulators, may enable configurable and expandable design verification solutions to be implemented at relatively low cost.

As described earlier, just as SNs 110 may simulate MUTs 220 as a series of timesteps, in some embodiments, an HEN 130 may also be configured to emulate the behavior of its LUT 315 in a series of timesteps. An HEN 130 may also exchange simulation information with other HENs and/or SNs, e.g., by sending formatted logical output signal values and/or commands via socket 285, and receiving and parsing input signal values and/or commands. The operation of one embodiment of a DDVS 100 wherein SNs perform simulation processing in a series of timesteps, and HENs perform hardware emulation in a series of timesteps, is described in further detail below in conjunction with the description of FIG. 4.

In some embodiments, as noted above, hardware emulation may also include at least two phases within an emulated timestep: a zero time phase and a real time phase. In such embodiments, zero time model 240 may provide generally similar functionality within emulation controller 380 as was provided within simulation controller 280. Thus, during the zero time phase of an emulated timestep, HENs 130, SNs 110, DCNs 120, and hub 140 may communicate with as many commands as desired (including commands which sample output signals of LUTs, and/or change the values of input signals of LUTs or the values stored in emulated registers within an LUT) while the emulation is frozen at the HENs and the simulation remains frozen at the SNs. Clock logic included within FPGA 311 may be programmed to remain in a desired (i.e., unchanged) state during a period when emulation is frozen and zero time phase operations are performed, and to resume clock transitions after the zero time phase completes. It is noted that in one embodiment, zero time phase processing may be omitted from an HEN 130, and that zero time model 240 may be omitted or not used in such embodiments. In another embodiment, multiple zero time and/or real time phases may be implemented.

The real time phase may include the sampling and driving of signals from LUTs 315, and may also include time in which the responses to the driven signals are emulated. The real time phase may further include evaluation of one or more commands received by the HEN 130 (e.g. reading or writing signal values relative to a current state at the HEN 130). The sample and drive of signals (and a subsequent emulation step of the LUT 315) may be iterated multiple times within a timestep. The sampling of signals may include reading the signal values from LUT 315 using the signal samplers within sample logic block 325, and transmitting one or more transmit commands with the sampled signal values. As in the case of SNs, physical models 250 and logical models 260 may be used to map physical signal representations (e.g., derived from sampling output signals of LUT 315) to user-defined logical signals, and vice versa. In one embodiment, the user-defined logical signals may be arranged in user-defined logical ports, and the routing of signals from node to node may be done on a logical port basis. Logical signals may be formatted according to a grammar used for inter-node communication messages, prior to being transmitted to another node (e.g., via hub 140). The driving of signals may include receiving one or more transmit commands with driven signal values. After receiving and parsing such a transmit command (e.g., from an SN or another HEN), emulation controller 380 may be configured to send a drive message (e.g., from physical models 250) to driver logical block 320 via the PCI driver 370 and PCI interface 340. Driver logic block 320 may be configured to applying the driven signal values to the LUT 315. The subsequent emulation of the LUT 315 may determine if the driven signal values cause any changes to signal values within the current timestep (e.g. if the driven signal asynchronously changes an output signal). If any output signals have changed, another phase of sampling and driving may occur. The sampling and driving may be repeated until each HEN does not detect any changes to its output signals in the current timestep, at which time the current timestep may terminate and the next timestep may begin. By iteratively sampling, driving, and evaluating the model, asynchronous signals may be handled within the timestep (if the asynchronous output changes during the timestep). During real time phase processing, physical models 250 and logical models 260 may be used to convert physical signal representations (e.g., derived from sampling output signals of LUT 315) to logical representations, and vice versa.

Figure 4:
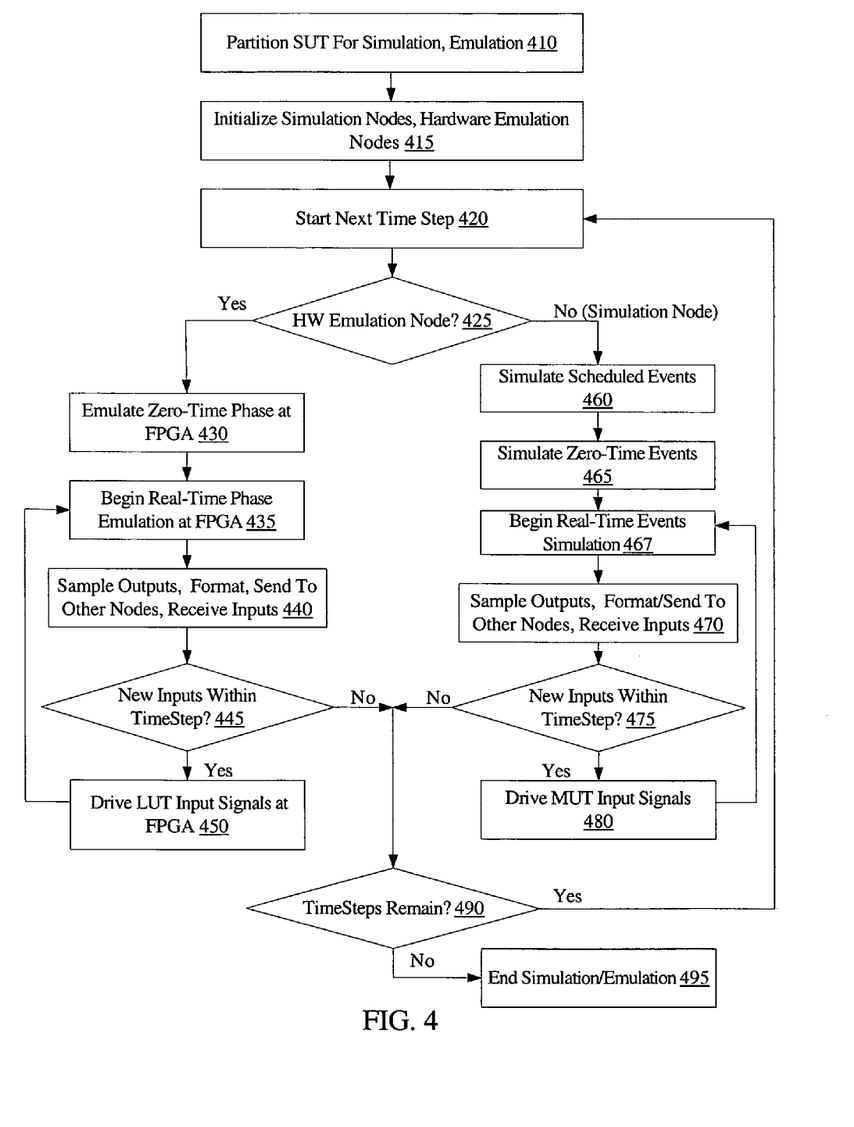
FIG. 4 is a flow diagram illustrating aspects of the operation of a distributed design verification system according to one embodiment.

FIG. 4 is a flow diagram illustrating aspects of the operation of a distributed design verification system 100 including HENs 130 and SNs 110 according to one embodiment. The illustrated embodiment may be configured to use timestep based simulation and emulation as described above. Prior to performing the design verification, the system under test (SUT) may be partitioned into suitable components or portions for simulation (at SNs) or emulation (at HENs) in the system (block 410). Various different criteria may be used to perform such partitioning in different embodiments; for example, the size of individual partitions may be limited based on logical component boundaries, gate count, the processing capabilities of various SNs 110 and HENs 130, etc. In some embodiments, automated tools may provide suggested partition boundaries based, for example, on some set of specified configurable parameters describing the simulation and emulation resources available. In one embodiment (such as that depicted in FIG. 3a), where a single HEN includes multiple FPGAs 311, closely related or interconnected portions of the SUT (i.e., portions of the SUT that may require extensive coordination or synchronization messages to be exchanged) may be selected for emulation using the FPGAs at the single HEN 130, so that inter-node communication is reduced during design verification. That is, in such an embodiment, signal information and/or other commands may be exchanged among different FPGAs 311 directly (e.g., via a PCI bus) without waiting for synchronization commands from hub 140.

Once the partitions have been decided, the SNs 110 and HENs 130 may each be initialized (block 415). During initialization, for example, emulated logic may be synthesized at the FPGAs 311 of the HENs 130, and MUTs 220 may be loaded or copied to SNs 110. After initialization is complete, the SNs 110 and HENs 130 may begin simulating/emulating the first timestep (block 420), for example in response to a command from a DCN 120. Depending on whether a given node is configured for hardware emulation or for software simulation (decision block 425), a different set of steps may then be performed at the given node.

As shown, timestep processing for a hardware emulation node 130 may begin with a zero time phase emulation at FPGA 311 as described above (block 430). In some embodiments, zero time phase emulation may also result in changes that require iterative emulation steps (not shown in FIG. 4). When zero time phase emulation at an HEN 130 has completed, or if no zero time phase emulation is to be performed at the HEN, in one embodiment the HEN may send a message indicative of such a completion (such as a "NOP" or "No-Op" command formatted in accordance with the grammar described above) to DCN 120. In such an embodiment, where DCN 120 is configured to coordinate the phases of a timestep, DCN 120 may be configured to wait until it receives zero time phase completion messages from all HENs and SNs. After such messages have been received from all participating SNs 110 and HENs 130, DCN 120 may be configured to send a message indicating the end of zero time phase processing to the SNs 110 and HENs 130 (such as a "ZT_Done" command formatted according to the grammar). As noted above, in some embodiments, HENs may be configured to omit zero time phase emulation (i.e., to skip the step illustrated in block 430), e.g., by immediately sending a message indicating a completion of zero time formatting to DCN 120. In another embodiment, DCN 120 may be configured to ignore HENs during zero time phase processing, and to coordinate zero time phase processing only among simulation nodes.

After zero time phase operations have been completed at all participating HENs and SNs, HEN 130 may proceed to begin performing real time phase emulation at FPGA 311 (block 435). As described above, as a result of real time phase emulation, certain output signals from LUT 315 may be sampled using sample logic block 325, transformed or translated into a logical signal, formatted by formatter 270, and sent to one or more additional nodes (block 440). In addition, during this step, input signals (e.g., from other HENs 130, or other SNs) may be received over socket 285, parsed by parser 275, transformed from a logical representation to a physical signal representation, and sent to FPGA 311 by PCI driver 370 via PCI interface 340. In some embodiments, input signals may also be received from other FPGAs within the same HEN during this step. In one embodiment, such input signals may be physical signals that do not require parsing and/or logical-to-physical transformations, unlike signals received from other nodes.

If the value of any of the received input signals for LUT 315 has changed during the timestep (decision block 445), driver logic block 320 within FPGA 311 may apply the input signal value or values to LUT 315 (block 450) and begin another iteration of real time phase emulation (i.e., repeat step 435 and following steps as described above). If no input signal requires further processing within the current timestep, in one embodiment HEN 130 may be configured to send a message indicative of real time emulation completion (e.g., a "NOP" command) to DCN 120. When such messages have been received from all HENs 130 and SNs 110 participating in the device verification, DCN 120 may be configured to send a message indicating that processing for the next timestep should be initiated to each participating HEN and SN. Upon receiving such a message (detected at decision block 490), HEN 130 may begin processing for the next timestep (i.e., go back to block 420). If no more time steps remain to be simulated or emulated, the verification is considered to be completed (block 495).

Timestep processing for a simulation node 110 may proceed through the steps starting with block 460, where events scheduled for the current timestep (e.g., as a result of a previous timestep) may be simulated. Subsequently, zero time phase simulation may be performed (block 465), which may include zero time PLI interactions between simulator 210 and zero time model 240. As with zero time phase processing at HENs 130, zero time phase processing at an SN 110 may also include iterative steps not shown in FIG. 4. Real time phase simulation processing may then be begun (block 467), e.g., using PLI 227. Output signals may be sampled and sent to other nodes after a physical-to-logical conversion and formatting, and input signals may be received from other nodes (block 470). If new input signal values are received for simulation within the current timestep, real time phase processing may be repeated beginning with the step illustrated in block 467. Once real time phase simulation processing for the current timestep is complete at all participating HENs and SNs, if timesteps remain to be simulated, processing for the next timestep may begin (block 420).

Figure 5:
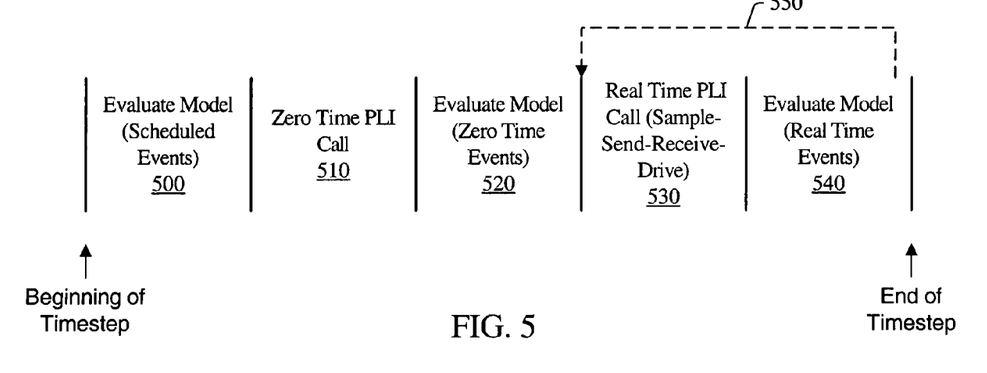
FIG. 5 is a timing diagram of one embodiment of a timestep at a simulation node.

FIG. 5 is a timing diagram of one embodiment of a timestep at a simulation node 110. In the embodiment of FIG. 5, the timestep includes several model evaluations at reference numerals 500, 520, and 540. In the depicted embodiment, a first programming language interface (PLI) call is performed (reference numeral 510) during zero time phase processing, and a second PLI call is made (reference numeral 530) during the real time phase processing.

In one embodiment, PLI 227 may be compatible with IEEE 1364-1995 standard. Generally, the PLI may comprise a set of simulator-defined and/or user-defined functions called by the simulator 210 at certain predefined points within the timestep. The code comprising the functions may be part of the simulation controller 280 (e.g., in the zero time model 240 or the physical models 250).

At the beginning of the timestep, the simulator 210 may evaluate all the scheduled events occurring within the simulation timestep (reference numeral 500). The simulator 210 may then call the PLI function or functions forming the zero time phase (reference numeral 510). In these functions, any zero time communication that is desired (e.g. testing various model signals/resources and modifying signals/resources) may be performed. The simulator 210 may then evaluate events which may have been scheduled due to zero time operations (if any) (reference numeral 520). For example, the zero time operations may have modified a signal or register value, which results in evaluation events for each sensitive process. After evaluating any zero-time-generated events, the second PLI call (reference numeral 530) to sample output signals (including bi-directional signals) and to drive input signals (including bi-directional signals) may be performed. The PLI function or functions may include the communication with hub 140 (and thus with other nodes) to send or transmit output signal values after sampling, and receive input signal values prior to driving (hence the label "sample-send-receive-drive"). If new input signal values are driven, the PLI function may communicate to the simulator 210 (e.g. by scheduling a callback) that the PLI functions are to be called again after evaluating the events caused by the new input signal values. Repeating the sample-send-receive-drive calls and associated processing is shown as the dotted arrow 550 in FIG. 5.

The sample/drive PLI function may schedule the callback each time new signal values are applied to the model. Thus, if an output signal changes within the current timestep (e.g. asynchronously), then the new value of the output signal may be transmitted within the current timestep. Similarly, if an input signal changes asynchronously, the new value of the input signal may be applied to the model during the current timestep (during the next iteration of the sample/drive PLI function). Once a sample/drive sequence occurs in which no input signal changes are applied and no output signal values change, the sample/drive PLI function may not schedule the callback. When the real time phase processing is complete at all participating nodes, the timestep may end (moving to the next timestep).

Figure 6:
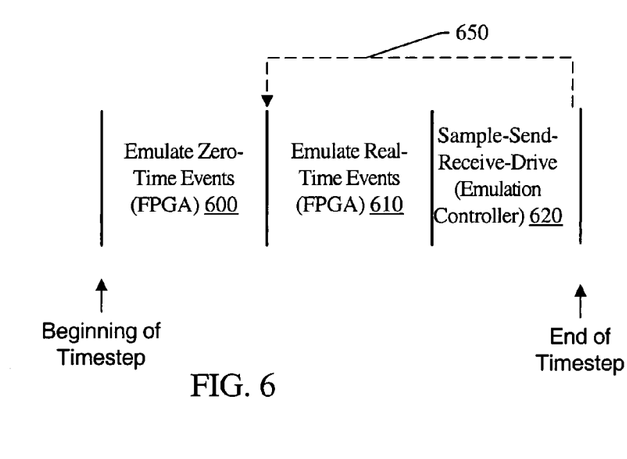
FIG. 6 is a timing diagram of one embodiment of a timestep at a hardware emulation node.

FIG. 6 is a timing diagram of one embodiment of a timestep at a hardware emulation node 130. Three periods within the timeslot are depicted, the first two of which include zero time phase emulation at FPGA 311 (reference numeral 600) and real time phase emulation at FPGA 311 (reference numeral 610). The third period (reference numeral 620) represents sample-send-receive-drive real time phase functionality similar to that described above for reference numeral 530 of FIG. 5. That is, during the third period, output signals from LUT 315 may be sampled and sent to other nodes (after being mapped to logical signals), input signals may be received from other nodes and the input signal values driven to LUT 315. As in FIG. 5, the real time phase processing steps (reference numerals 610 and 620) may be repeated if signal values change asynchronously, as illustrated by dotted arrow 650. Once real time phase processing has completed at all participating nodes, emulation of the next timestep may begin. Of the three periods illustrated within the timestep shown in FIG. 6, the first two include hardware emulation phases, and the third represents software operations performed by emulation controller 380. In contrast to FIG. 5, FIG. 6 contains no PLI calls, which may often represent a substantial proportion of the processing costs associated with simulation. Thus, due to the offloading of work to FPGA 311, the total amount of software processing required at an HEN 130 to emulate a given LUT 315 may be substantially less in some embodiments than the amount of software processing required to simulate a comparable MUT 220.

It is noted that while a PCI expansion board has been used for FPGA 311 in some of the embodiments described above, in other embodiments other types of expansion boards (such as PCI-X boards, or proprietary boards) and buses and interconnect technologies (such as PCI-X, proprietary buses, or serializer/deserializer (SERDES) technology) capable of supporting the FPGA and interconnect functionality described above may be employed instead of, or in addition to, PCI boards and buses. It is also noted that the functions performed by the various software components or modules shown in FIG. 2 and FIG. 3b (e.g., simulation controller 280 and its subcomponents, emulation controller 280 and its subcomponents, etc.) may be combined within a single executable program, or distributed among different executables in any combination.

Figure 7:
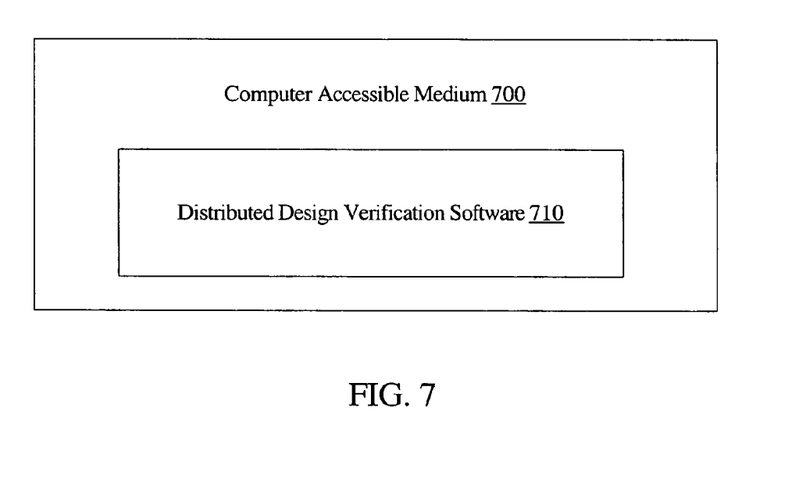
FIG. 7 is a block diagram of a computer accessible medium.

FIG. 7 is a block diagram of one embodiment of a computer accessible medium 700, comprising distributed design verification software 710 including instructions which, when executed, implement the functionality of the nodes of distributed design verification system 100 described above. That is, distributed design verification software 710 may implement the functionality of simulation nodes, hardware emulation nodes, distributed control nodes, and a hub. As described earlier, various software modules implementing the functionality of different nodes may be packed together as a single software program, or packaged in any combination. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:

a simulation node configured to simulate a first portion of a system under test in a series of simulation timesteps, wherein each simulation timestep includes a zero time phase simulation and real time phase simulation, wherein during the zero time phase simulation, a state of a simulation of the first portion of the system under test is frozen while input signals of the simulation of the first portion are changed and output signals of the simulation of the first portion are sampled, and wherein during the real time phase simulation, the state of the simulation of the first portion of the system under test is iteratively changed in response to sampling output signals of the simulation of the first portion and driving input signals of the simulation of the first portion, and wherein the simulation node is configured to generate a first completion message in response to completing the zero time phase simulation;

a hardware emulation node comprising a field programmable gate array (FPGA) device configured to emulate a second portion of the system under test in a series of emulation timesteps, wherein each emulation timestep includes a zero time phase emulation and real time phase emulation, wherein during the zero time phase emulation, a state of an emulation of the second portion of the system under test is frozen while input signals of the emulation of the second portion are changed and output signals of the emulation of the second portion are sampled, and wherein during the real time phase emulation, the state of the emulation of the second portion of the system under test is iteratively changed in response to sampling output signals of the emulation of the second portion and driving input signals of the emulation of the second portion, and wherein the emulation node is configured to generate a second completion message in response to completing the zero time phase emulation; and a control node configured to cause the simulation node to initiate the real time phase simulation in response to receiving both the first completion message and the second completion message, and wherein the control node is further configured to cause the hardware emulation node to initiate the real time phase emulation in response to receiving both the first completion message and the second completion message.

2. The system as recited in claim 1, wherein the FPGA device is mounted on an expansion board.

3. The system as recited in claim 2, wherein the expansion board is a Peripheral Component Interconnect (PCI) board.

4. The system as recited in claim 1, wherein the FPGA device includes a drive logic block configured to drive an input signal of the emulation of the second portion of the system under test.

5. The system as recited in claim 4, further comprising an emulation controller, wherein the drive logic block is configured to drive the input signal in response to a drive message from the emulation controller.

6. The system as recited in claim 5, wherein the emulation controller is further configured to generate the drive message in response to simulation information received from the simulation node.

7. The system as recited in claim 5, wherein the FPGA device includes a sample logic block configured to sample an output signal of the emulation of the second portion of the system under test.

8. The system as recited in claim 7, wherein the emulation controller is configured to receive a sampled value of the output signal, and to map the output signal to a logical signal.

9. The system as recited in claim 8, wherein the emulation controller is further configured to create a formatted representation of the logical signal according to a grammar.

10. The system as recited in claim 6, further comprising a hub coupled to the simulation node and the hardware emulation node, wherein the hub is configured to route the simulation information.

11. The system as recited in claim 10, wherein the control node is configured to coordinate a simulation operation at the simulation node with a hardware emulation operation at the hardware emulation node.

* * * * *